(12) United States Patent
Morozov et al.

(10) Patent No.: US 10,139,503 B2
(45) Date of Patent: Nov. 27, 2018

(54) DOUBLY RESONANT SEISMIC SOURCE

(71) Applicant: Teledyne Instruments, Inc., Thousand Oaks, CA (US)

(72) Inventors: Andrey K. Morozov, North Falmouth, MA (US); Douglas C. Webb, Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 203 days.

(21) Appl. No.: 15/179,340

(22) Filed: Jun. 10, 2016

(65) Prior Publication Data
US 2017/0031039 A1 Feb. 2, 2017

Related U.S. Application Data

(63) Continuation of application No. 14/809,846, filed on Jul. 27, 2015, now Pat. No. 9,383,463.

(51) Int. Cl.
*G01V 1/133* (2006.01)
*G01V 1/38* (2006.01)

(52) U.S. Cl.
CPC ........... *G01V 1/133* (2013.01); *G01V 1/38* (2013.01)

(58) Field of Classification Search
CPC .................................. G01V 1/133; G01V 1/38
See application file for complete search history.

(56) References Cited

U.S. PATENT DOCUMENTS

| 4,381,044 A | 4/1983 | Kirby |
| 4,483,411 A | 11/1984 | Mifsud |
| 4,556,120 A | 12/1985 | Kirby |
| 7,823,689 B2 | 11/2010 | Aronstam et al. |
| 8,331,198 B2 * | 12/2012 | Morozov ............... G01V 1/135 367/142 |
| 8,441,892 B2 | 5/2013 | Morozov et al. |
| 8,570,835 B2 | 10/2013 | Chelminski |

(Continued)

FOREIGN PATENT DOCUMENTS

| CA | 2961840 A1 * | 9/2017 |
| EP | 0238736 A1 | 9/1987 |

(Continued)

OTHER PUBLICATIONS

International Search Report and Written Opinion for International Application No. PCT/US2016/036946, dated Sep. 9, 2016 (13 pages).
Morozov, A., "Doubly-Resonant Underwater Acoustic Projector for Long-Range Communications and Position," Woods Hole Oceanographic Institution, downloaded from http://www.whoi.edu/hpb/viewPage.do?id=1533&cl=4 on Apr. 4, 2015.

(Continued)

*Primary Examiner* — Daniel Pihulic
(74) *Attorney, Agent, or Firm* — K&L Gates LLP

(57) ABSTRACT

A sound source includes a first gas filled underwater resonator, a second gas filled underwater resonator connected to the first resonator and at least one excitation member configured to excite the first gas filled underwater resonator and the second gas filled underwater resonator, where the first gas filled underwater resonator is permanently tuned to produce a first resonant frequency upon excitation by the at least one excitation member, where the gas filled underwater second resonator is permanently tuned to produce a second resonant frequency upon excitation by the at least one excitation member, and where the first resonant frequency is different from the second resonant frequency.

20 Claims, 17 Drawing Sheets

(56) References Cited

U.S. PATENT DOCUMENTS

| | | | |
|---|---|---|---|
| 8,634,276 B2 * | 1/2014 | Morozov | G01V 1/135 367/142 |
| 8,670,293 B2 | 3/2014 | Morozov | |
| 8,689,935 B2 | 4/2014 | Wilson et al. | |
| 8,942,060 B2 | 1/2015 | Abma et al. | |
| 9,383,463 B1 * | 7/2016 | Morozov | G01V 1/38 |
| 2004/0112594 A1 | 6/2004 | Aronstam et al. | |
| 2012/0243377 A1 * | 9/2012 | Morozov | G01V 1/135 367/143 |
| 2013/0001010 A1 | 1/2013 | Wilson et al. | |
| 2013/0010573 A1 * | 1/2013 | Morozov | G01V 1/135 367/142 |
| 2014/0056108 A1 | 2/2014 | Chelminski | |
| 2017/0031039 A1 * | 2/2017 | Morozov | G01V 1/133 |
| 2017/0276812 A1 * | 9/2017 | Morozov | G01V 1/137 |

FOREIGN PATENT DOCUMENTS

| | | | | |
|---|---|---|---|---|
| EP | 3223041 A1 * | 9/2017 | | G01V 1/133 |
| JP | 2017201302 A * | 11/2017 | | |
| WO | WO-2017019186 A1 * | 2/2017 | | G01V 1/133 |

OTHER PUBLICATIONS

Morozov, A., "Modeling and Testing of Carbon-Fiber Doubly-Resonant Underwater Acoustic Transducer," Proceedings of the 2013 COMSOL Conference in Boston.

Avedik F. et al. "Single Bubble Air-Gun Array for Deep Exploration," Geophysics Society of Exploration, vol. 58. No. 3. Mar. 1, 1993, pp. 366-382.

* cited by examiner

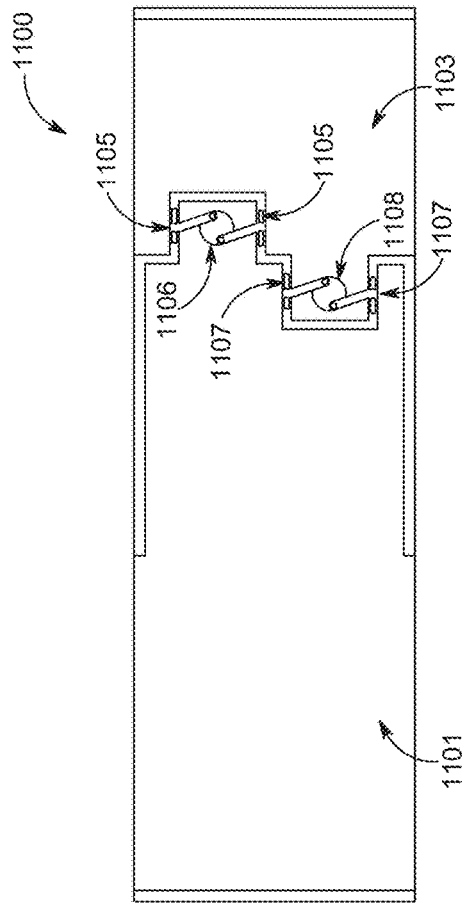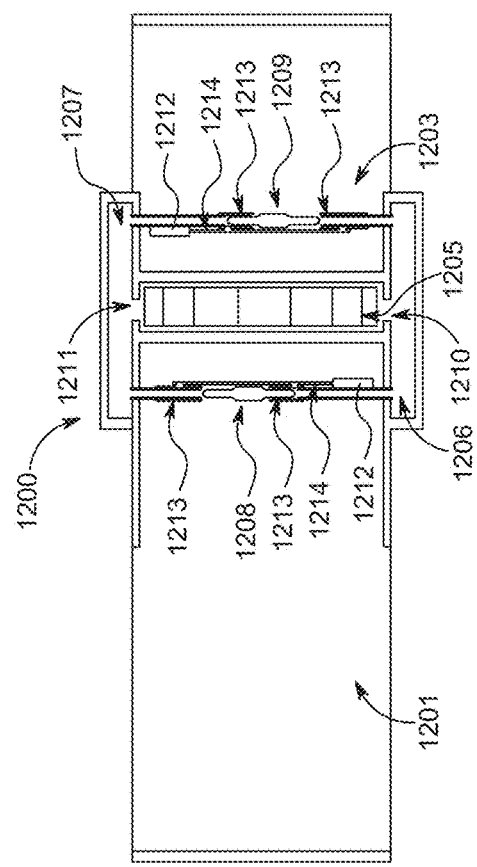

DOUBLY RESONANT SEISMIC SOURCE

CROSS REFERENCE TO RELATED APPLICATIONS

The present application is a continuation application filed under 35 U.S.C. § 120 to U.S. patent application Ser. No. 14/809,846, titled DOUBLY RESONANT SEISMIC SOURCE, filed Jul. 27, 2015, now U.S. Pat. No. 9,383,463, the disclosure of which is incorporated herein by reference in its entirety.

BACKGROUND

Low frequency acoustic and seismo-acoustic projectors find applications in marine seismic operations, underwater ocean acoustic tomography, long-range acoustic navigation and communications and deep-bottom penetration seismic profiling in the offshore oil and gas industry. Such sources may be used in Arctic under-ice acoustic far-range navigation and communications, underwater global positioning systems (RAFOS), and long-range ocean acoustic tomography and thermometry. Low-frequency underwater sound sources should be powerful and efficient.

The low frequency source can be an explosive (e.g. dynamite), or it can use more complicated technology such as an air gun providing single pulses, or vibroseis providing continuous frequency sweeps. Some acoustic sources in use for seismic applications, such as air gun, plasma (sparker) sound sources and boomers, are of the impulse type, where the transmitter emits a large non-coherent pressure pulse during a short time interval. Seismic air-gun surveys, such as those used in the exploration of oil and gas deposits underneath the ocean floor, produce loud, sharp impulses that propagate over large areas and increase noise levels substantially. Such a signal is not highly controllable, either in frequency content or repeatability. Coherent sound sources such as marine vibroseis may be much quieter and potentially less harmful for marine environments and should be used instead of air-guns in certain exploration activities.

Current continuous wave type sources make use of hydraulic, pneumatic, piezo-electric or magnetostrictive drivers and different type of resonance systems to store acoustic energy and to improve impedance matching, when generating low-frequency sound waves in water. The power output of a simple acoustic source is proportional to the squares of volume velocity and frequency and needs a large vibrating area to achieve reasonable levels. As a result, the sound source can become unacceptably large and expensive.

Seismic sources in the form of an underwater gas-filled balloon (or bubble) have been proposed and patented, for example in U.S. Pat. Nos. 8,441,892, 8,331,198, and 8,634,276, each of which is incorporated by reference herein in its entirety. A resonant bubble seismic source is a simple, efficient, narrow-band projector. The resonant bubble seismic source, also called a bubble resonator, may have a Q factor in shallow water that is approximately equal to 40 and its frequency band may be very narrow. The pressure gas-filled underwater bubble (or balloon from an elastic material) generates sound by a symmetrical air pump with open cylinders driven by an electrical motor. Seismic survey applications demand a large frequency band and underwater bubble sources may be mechanically tuned over a large frequency band.

To cover a large frequency band, a tunable air-bubble resonator has been patented, for example in U.S. Pat. No. 8,634,276. In that system, a projector changes its resonance frequency by mechanically changing the length of the air-duct between the two inside resonators. A computer-controlled, electromechanical actuator moves the cylindrical sleeve along the tube conducting air between two inside resonators, keeping the projector in resonance at the instantaneous frequency of a swept frequency signal. The computer synthesizes the linear frequency-modulated signal; compares the phase between transmitted and reference signals; and, using a Phase-Lock Loop (PLL) system, keeps the resonator bubble frequency in resonance with the driver frequency.

This tunable bubble seismic source works reasonably well at frequencies higher than 20 Hz, but at lower frequencies turbulent losses demand the large dimensions for a tunable air duct and for the whole resonator. Dimensions for a source with a frequency band of 5-20 Hz will be more than the maximum limit for a standard air-gun deployment system (4 tons). At the same time, there is a great interest and demand for a much lower frequencies down to 1 Hz. A high-Q tunable resonance systems have many other disadvantages: they are too sensitive to towing depth and water flow fluctuations; they have limitation on the frequency sweep rate; they transmit only specific waveforms with a slowly changing frequency; they are complicated and need a specially controlled system to keep the resonant frequency equal to the instant frequency of a transmitted signal; they have large start/stop transient time.

SUMMARY

To improve parameters of a frequency swept, tunable, resonant, seismic source for a very low frequency band, a doubly-resonant, broad band, seismic source is disclosed herein. A low frequency, deep water sound source with resonator, in the form of a pressure, gas-filled, underwater bubble or balloon, manufactured from an elastic material, is different from any known engineering solution in acoustical actuator technology. To achieve high-efficiency, emitting sound pressure by a symmetrical air pump with opened cylinders, driven by an electrical linear or rotary motor is disclosed herein. An electrical motor driver may be controlled by a computer and synchronized with digitally synthesized signal waveforms. According to embodiments, the electric motor can be a linear motor or traditional rotary motor with crank-shaft mechanics. For very high power, when harmonic content is not important, we propose a turbo-pump with controllable proportional valves.

According to one embodiment, the sound source may comprise two bubble resonators tuned permanently to two different frequencies and the edges of a frequency band. In one embodiment, the vibrations may be excited by a piston driven by a linear or a rotary motor between the resonators. Further, the resonators may be coupled through water and they will form doubly-resonant frequency response similar to those for RF coupled LC oscillators, which are widely used in a common radio-receivers. According to embodiments, a volume dimension for an underwater seismic source may be 3-4 times smaller than for a tunable seismic source. It can less than 4000 kg and can easily fit the weight and dimension requirements for air-gun replacements. [it is usual crane capacity in airgun ship deployment system. According to embodiments, the seismic source may be configured to operate at a frequency lower than 20 Hz. This source will be less sensitive to depth (pressure) change and to water flow fluctuations; the speed of the frequency sweep can be faster; it can transmit arbitrary waveforms with a frequency-phase-amplitude modulation; it will not need a special resonant-frequency control system; and it will have a small start/stop transient time.

Goals of the embodiments disclosed herein include making a sound source smaller, cheaper, more reliable and more powerful than any known device. In addition, it may be suitable for arbitrary waveform transmissions and may have a lower manufacturing cost than current devices. According to embodiments, a doubly-resonant broadband seismic source is proposed that may be comprised of two bubble resonators, tuned permanently to two different frequencies at the edges of a frequency band. The vibrations may be excited by a piston, which may be driven by a linear or rotary motor between the resonators. According to one embodiment, the resonators may be coupled through the water and have a doubly-resonant frequency response, similar to coupled LC oscillators, which are widely used in radio-receivers. According to one embodiment, a volume of the underwater seismic source will be 3-4 times smaller than for the tunable variant. It will meet the required demand for air-gun replacements for a 5-20 Hz band, and even for a frequency lower than 5 Hz. This source will be less sensitive to depth and water flow fluctuations. The rate of a frequency sweep will be faster, it can transmit waveforms with an arbitrary frequency-phase-amplitude modulation, it will not need a special resonant frequency control system with PLL, and it will have a small start/stop transient time.

FIGURES

Various features of the embodiments described herein are set forth with particularity in the appended claims. The various embodiments, however, both as to organization and methods of operation, together with advantages thereof, may be understood in accordance with the following description taken in conjunction with the accompanying drawings as follows.

FIG. 1 is a diagram of an embodiment of a doubly-resonant broadband seismic source according to the present disclosure.

FIGS. 2A, 2B, and 2C are diagrams of another embodiment of a doubly-resonant broadband seismic source according to the present disclosure.

FIG. 11 is a diagram of another embodiment of a doubly-resonant broadband seismic source according to the present disclosure.

FIG. 12 is a diagram of another embodiment of a doubly-resonant broadband seismic source according to the present disclosure.

DETAILED DESCRIPTION

Figure 1:
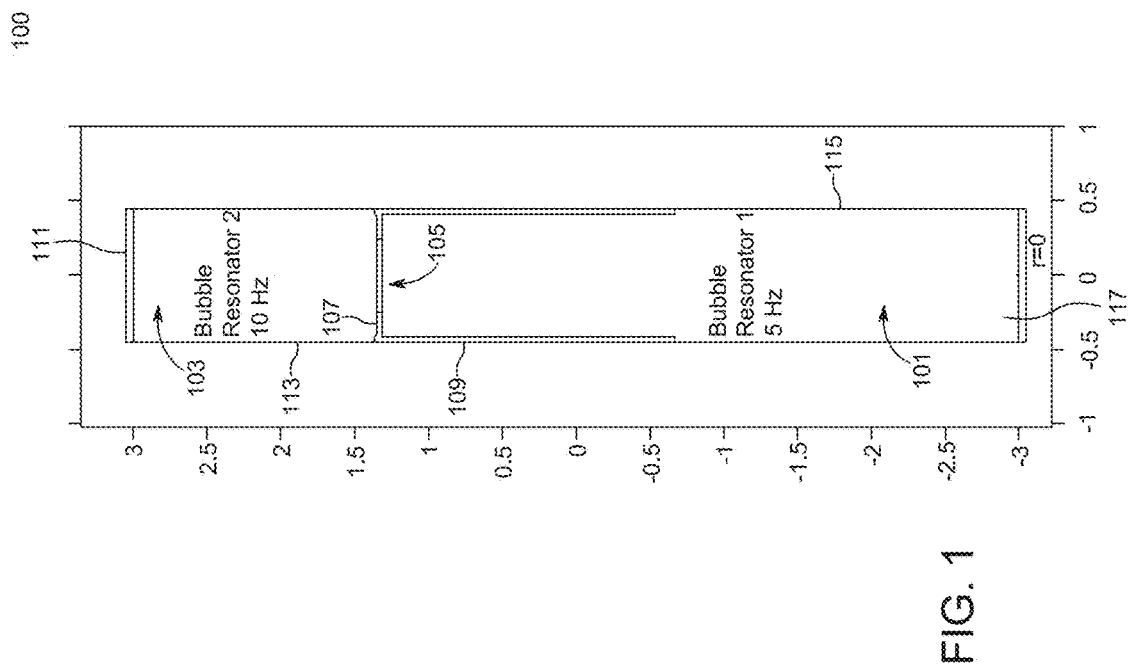

There is a growing demand for a very low frequency sound source with a frequency range of 5-100 Hz for applications such as: marine seismic operations; Arctic under-ice acoustic far-range navigation and communications; deep bottom penetration seismo-acoustic profiling; and long-range ocean acoustic tomography. In most applications, these examples require a high efficiency broadband source with a reasonable cost. The bubble transducer has the potential for highly efficient performance of up to 30-40%. Modern technology allows us to revise the preliminary tests with the bubble source and it suggests a much more efficient engineering solution.

A differential equation for bubble oscillations is known:

$$\frac{d^2p}{dt^2} + \frac{\omega_r}{Q}\frac{dp}{dt} + \omega_r^2 = \frac{P_0}{V_0}\frac{dV_a}{dt}; \text{ and} \qquad (1)$$

$$\frac{\omega_r}{Q} = \frac{\gamma P_0 S_0}{V_0 \rho c} = \omega_r k_r a; \qquad (2)$$

Where $$\omega_r^2 = \frac{\gamma P_0 S_0}{V_0 \rho a}$$

is the resonance frequency of the spherical bubble with the radius a volume $V_0=(4/3)\pi a^3$, and pressure $P_0$; $\gamma$ is the ratio of the specific heats at constant pressure to specific heat at constant volume for gas within the bubble; $k_r=\omega_r/c$ is the resonance wave number; and $Q=1/(k_r a)$ is the Q-factor.

One can see that the resonance frequency and inverted Q-factor are increasing proportionally with the square root of pressure or depth. At shallow water, the Q-factor is ~40. To cover a large frequency band, a sound source can be tuned by mechanically changing length of air-duct between two inside resonators. A tuneable variant of the bubble seismic source may work at frequencies higher than 20 Hz, but at lower frequencies turbulent friction losses demand large dimensions for a tuneable air duct and for the resonator as a whole. The volume of the source for a frequency band 5-20 Hz may be as large as 12 cubic meters. Such a large tuneable resonance source may be too sensitive to depth and water flow fluctuations, and it may transmit only specific waveforms with a limited frequency rate. A special tracking controller may also be required to keep the resonance frequency equal to an instant frequency of signal.

According to one embodiment, a sound source of the present disclosure comprises a first gas filled underwater resonator, a second gas filled underwater resonator connected to the first resonator and at least one excitation member configured to excite the first gas filled underwater resonator and the second gas filled underwater resonator. The first gas filled underwater resonator is permanently tuned to produce a first resonant frequency upon excitation by the at least one excitation member and the second gas filled underwater resonator is permanently tuned to produce a second resonant frequency upon excitation by the at least one excitation member. The first resonant frequency is different from the second resonant frequency. According to one embodiment, at least one of the first resonant frequency and the second resonant frequency is within a range of 5-20 Hz. In another embodiment, at least one of the first resonant frequency and the second resonant frequency is within a range of 5-20 Hz.

A doubly-resonant broadband seismic source according to the present disclosure may provide a sound source that smaller, cheaper, more reliable and more powerful than any known prototype. In addition, a doubly-resonant broadband seismic source according to the present disclosure is suitable for arbitrary waveform transmissions and may have lower manufacturing costs. According to one embodiment, a doubly-resonant broadband seismic source comprises two bubble resonators, tuned permanently to two different frequencies at the edges of a frequency band. Vibrations may be excited by a piston, which may be driven by a linear or rotary motor between the resonators. The resonators may be coupled through the water and have a doubly-resonant frequency response, similar to coupled LC oscillators, which are widely used in radio-receivers. The volume of the underwater seismic source may be 3-4 times smaller than the volume for a tuneable bubble seismic source. Additionally, a doubly-resonant broadband seismic source may meet the limitation to weight and dimension required for air-gun replacements for a 5-20 Hz band, and/or for a frequency lower than 5 Hz. According to embodiments, a doubly-resonant broadband seismic source may be less sensitive to depth and water flow fluctuations than a tuneable bubble seismic source. Additionally, a rate of a frequency sweep may be faster than a tuneable bubble seismic source, and it may be able transmit waveforms with an arbitrary frequency-phase-amplitude modulation. Embodiments of the present disclosure may not require a special resonant frequency control system, for example with a phase lock loop (PLL) controller. Furthermore, embodiments of the present disclosure may have a small start/stop transient time.

FIG. 1 illustrates an embodiment of a doubly-resonant broadband seismic sound source 100 according to the present disclosure. All dimensions indicated in FIG. 1 are in meters. In the embodiment of FIG. 1, the sound source 100 comprises a first gas filled underwater resonator 101, a second gas filled underwater resonator 103 connected to the first resonator 101 and at least one excitation member 105 configured to excite the first gas filled underwater resonator 101 and the second gas filled underwater resonator 103. The gas that fills the resonators may be any gas that functions appropriately in the environment that the doubly-resonant broadband seismic sound source 100 is to be deployed. For example, the gas may be normal air, oxygen, nitrogen, carbon dioxide, etc. along with any combinations as appropriate.

According to embodiments, the first and second resonators 101, 103 may be underwater bubble cylindrical resonators. Each of the resonators 101, 103 may comprises inelastic edges and elastic cylindrical walls under internal pressure. As shown in FIG. 1, the resonators 101, 103 may each comprise a membrane 113, 115 with a metal end cap 111, 117. The metal end cap 111, 117 may comprise aluminium as shown in FIG. 1. While the shape of the resonators 101, 103 is shown and described as cylindrical, the resonators 101, 103 may be sized and configured as appropriate and the entirety or a portion thereof may include for example, a tubular shape, a square or rectangular shape, a spherical shape, etc. Additionally, the first resonator and/or the second resonator may comprise a bubble cylindrical resonator. According to embodiments, the first resonator 101 may be permanently tuned to produce a first resonant frequency upon excitation by the excitation member 105 and the second resonator 103 may permanently tuned to produce a second resonant frequency upon excitation by the excitation member 105. As shown in the embodiment of FIG. 1, the first resonant frequency is different from the second resonant frequency.

The excitation member 105 may be configured to excite the first resonator 101 and the second resonator 103 by changing a volume of the interior chamber of the first resonator 101 and by changing a volume of the interior chamber of the second resonator 103. Additionally, the excitation member 105 may be configured to excite the first resonator 101 and the second gas filled resonator sequentially. In another embodiment, the excitation member 105 is configure to move between an interior chamber of the first resonator 101 and an interior chamber of the second resonator 103 in opposite directions. According to embodiments, the excitation member 105 may comprise at least one piston and a motor, where the at least one piston is driven by the motor. Additionally, the motor may be located between the first resonator 101 and the second resonator 103. The excitation member may be configured to excite the first resonator 101 and/or the second resonator 103 by changing a volume of an interior chamber of the first resonator 101 and/or a volume of an interior chamber of the second resonator 103.

Additionally, the at least one motor may comprise a rotary motor an/or a linear motor and the excitation member 105 may be configured to control an amplitude of sound emitted by the sound source 100 based on stroke displacement of the at least one linear motor and/or based on a difference of rotation phase of the at least two rotary motors according to the embodiment shown and described with regard to FIG. 11. In another embodiment, the excitation member 105 may comprise a regenerative rotary blower and two gas-accumulating tanks connected with two valves between the tanks and the first resonator 101 and two valves between the tanks the second resonator 103 such that the valves are configured to open and close to create a pressure pulse and gas exhaust in both resonators similar to the effect of the moving piston according to the embodiment shown and described with regard to FIG. 12. According to additional embodiments, the excitation member 105 may comprise any or all aspects of the motor and valves as discussed above, alone or in combination.

As shown in FIG. 1, the two resonators 101, 103 comprise solid material edges and elastic membrane cylindrical walls under internal pressure. In one embodiment, the edges of the resonators may be made of metal, such as for example, aluminium. The resonators 101, 103 are shown as being separated by a wall 107 with the excitation member 105 as a moving piston in the middle. The piston may be configured to move through an aperture of the wall 107 to excite at least one of the first resonator 101 and/or the second resonator 103. The wall 107 may be a connection between the resonators 101, 103. The resonance frequency of each resonator 101, 103 is shown as 5 Hz and 10 Hz, respectively. According to embodiments, the resonance frequency $f_r$ of each resonator may be within a range of 5-10 Hz and may be proportional to the square root of the ratio of the surface area $S_0$ of the membrane to the internal volume $V_0$:

$$f_r \sim \sqrt{\frac{S_0}{V_0}},$$

To obtain a desired resonant frequency of the resonators 101, 103, an inelastic device, for in example in the form of a tube, may surround at least a portion of one of the first resonator 101 and/or the second resonator 103. According to the embodiment of FIG. 1, to make a resonance frequency of the resonator 101 lower than the resonator 103, the membrane portion or bubble of the resonator 101 may be partly covered by a metal cylinder 109, which may be comprised of, for example, aluminum. It is important to note that even when the pressure changes, a ratio between the frequencies of the resonators 101, 103 may remain constant. As shown in FIG. 1, the wall 107 separating two resonators 101, 103 has a hole with a moving piston 105 in it. In the embodiment shown in FIG. 1, the excitation member 105 is located in the middle of the wall 107; however, in other embodiments the excitation member 105 may be located off-center. The piston 105 operates to change the volume in the resonators 101, 103 in an opposite fashion such that when the volume in the resonator 103 is increasing, volume in the resonator 101 it is decreasing. In one embodiment, the excitation member 105 may comprise a regenerative rotary turbo-compressor, two gas-accumulating tanks and four electrically controlled proportional valves to create the pressure impulse and gas exhaust synchronically inside resonators in a way similar to moving piston effect.

Figure 2A:
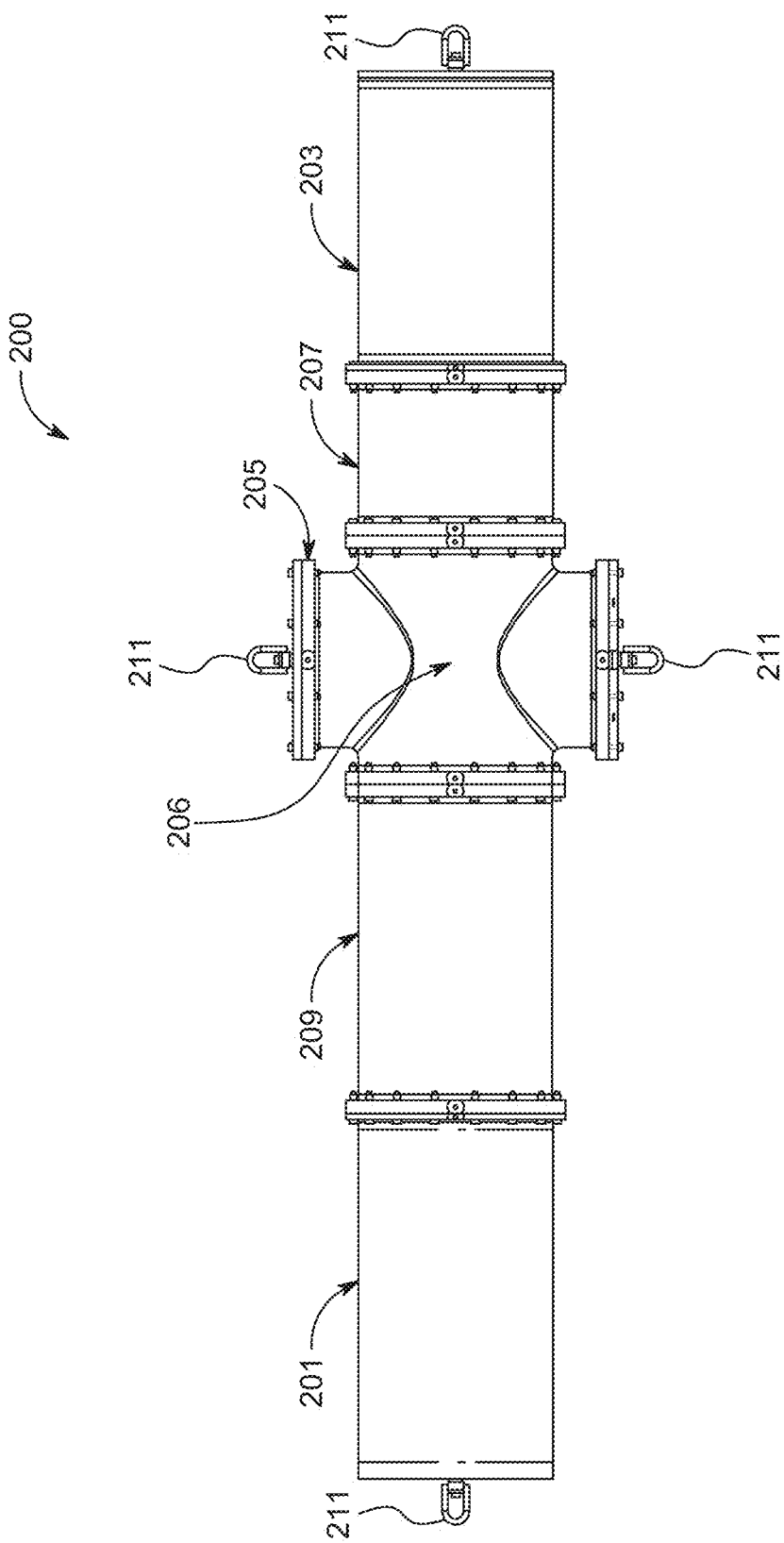
Figure 2B:
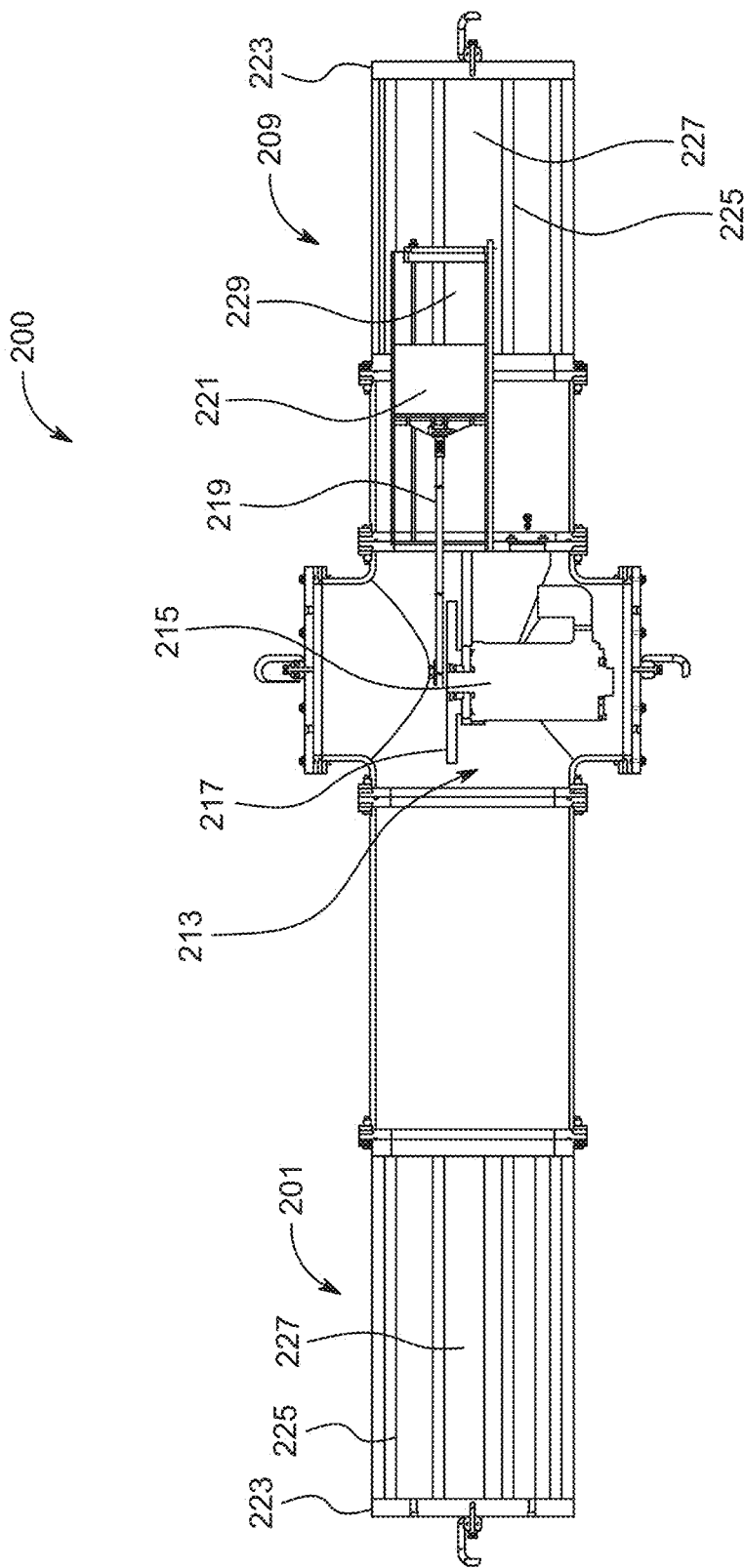
Figure 2C:
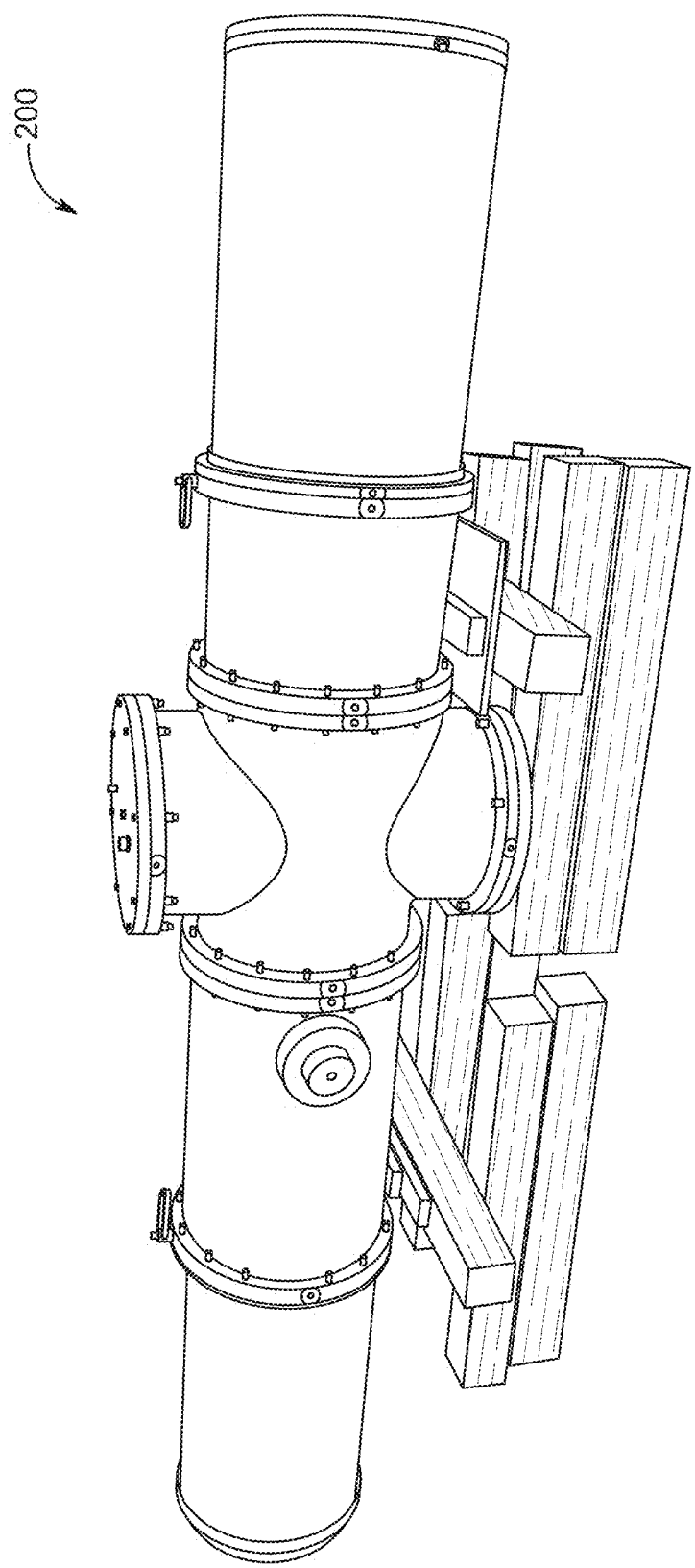

FIGS. 2A-2C illustrate another embodiment of a doubly-resonant broadband seismic sound source 200. The sound source 200 comprises a high-frequency bubble resonator 201 that has a rubber membrane 227, a tubular hall 209 for the high-frequency bubble resonator 201, a motor section housing 206, an endcap 205 for the access to the motor section that includes the excitation member 213, a tubular hall 207 for the low-frequency resonator 203, and the low-frequency bubble resonator 203 that has a rubber membrane 227. Loading or towing connections 211 may be provided at appropriate locations on the doubly-resonant broadband seismic sound source 200. In addition, each tubular hall 203, 207 may comprise aluminum or other solid rigid material, such as metal, composite carbon-fiber or fiber-glass, glass, ceramic, etc. along with combination thereof.

Each resonator 201, 209 may comprise rods 225 that support an endcap 223 where the rods 225 are covered by the rubber membrane 227. The excitation member 213 comprises an electric motor 215, a flywheel 217, a crank-shaft 219, and a piston 221 that travels within chamber 229. Further, the rods 225 and endcaps 223 may comprise a metal, such as steel, aluminum, or any other material that provides sufficient rigidity where necessary. In the embodiment shown in FIG. 2C, the doubly-resonant broadband seismic sound source 200 has dimensions of 0.56 m in diameter, 4 m in length, and a weight of 1232 kg.

Figure 3:
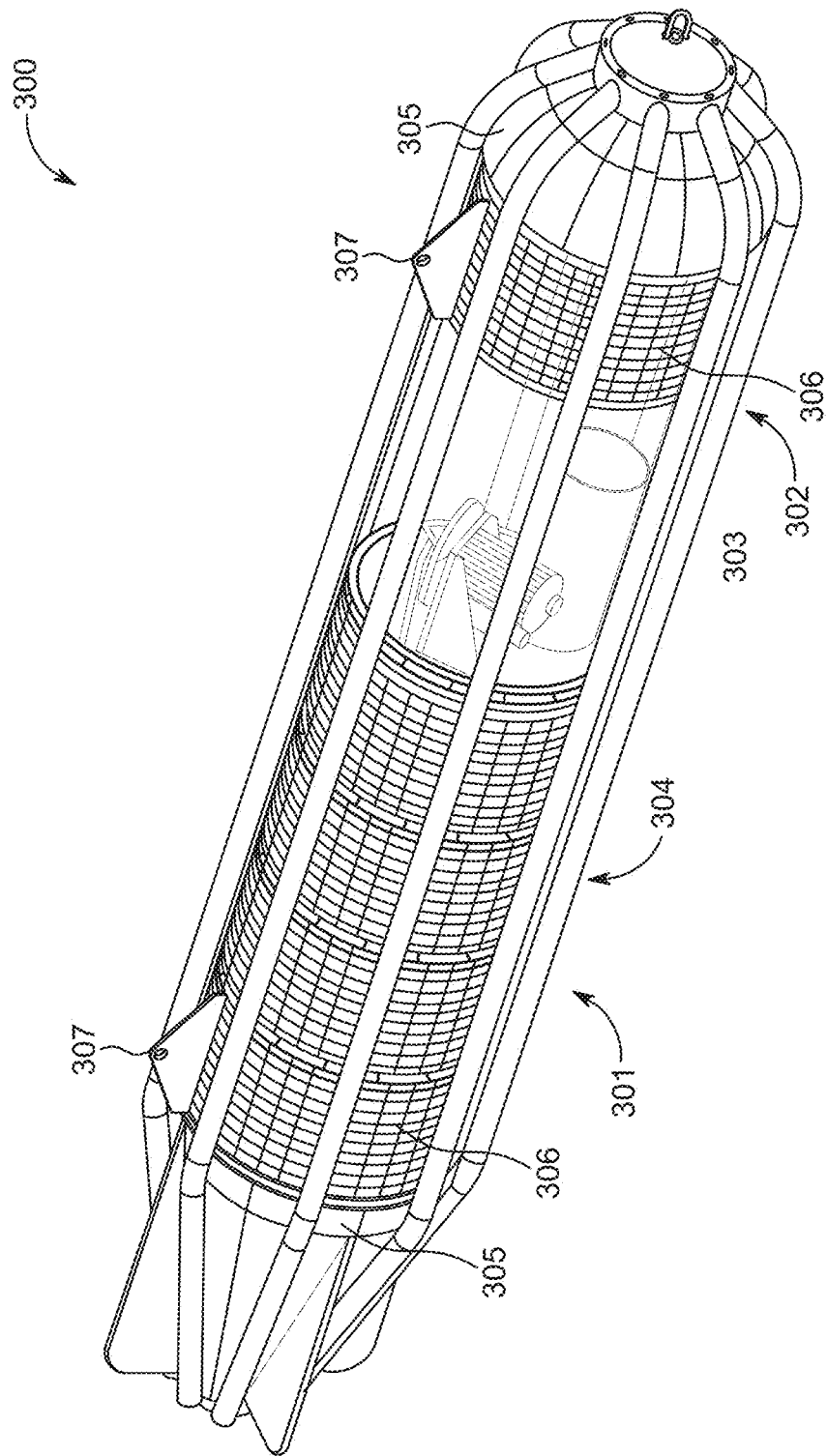
FIG. 3 is a diagram of another embodiment of a doubly-resonant broadband seismic source according to the present disclosure.

FIG. 3 provide an exterior view of another embodiment of a doubly-resonant broadband seismic sound source 300. As shown, the doubly-resonant broadband seismic sound source 300 comprises a first, low frequency, resonator 301, a second, high frequency, resonator 302, a motor section 303, and a cage or frame 304. Each of the first resonator 301 and the second resonator 302 has an endcap 305 and a membrane 306 that is on an exterior surface of each resonator 301, 302. The endcap 305 may comprise fins or other structures to allow the doubly-resonant broadband seismic sound source 300 to be towed through water in a controlled fashion. The frame 304 may also comprise at least one loading or towing connections 307. The frame 304 may be configured to enclose the entire the sound source 300 and is sized and configured to allow for proper towing during use and also to protect the sound source 300 from impact.

Figure 4:
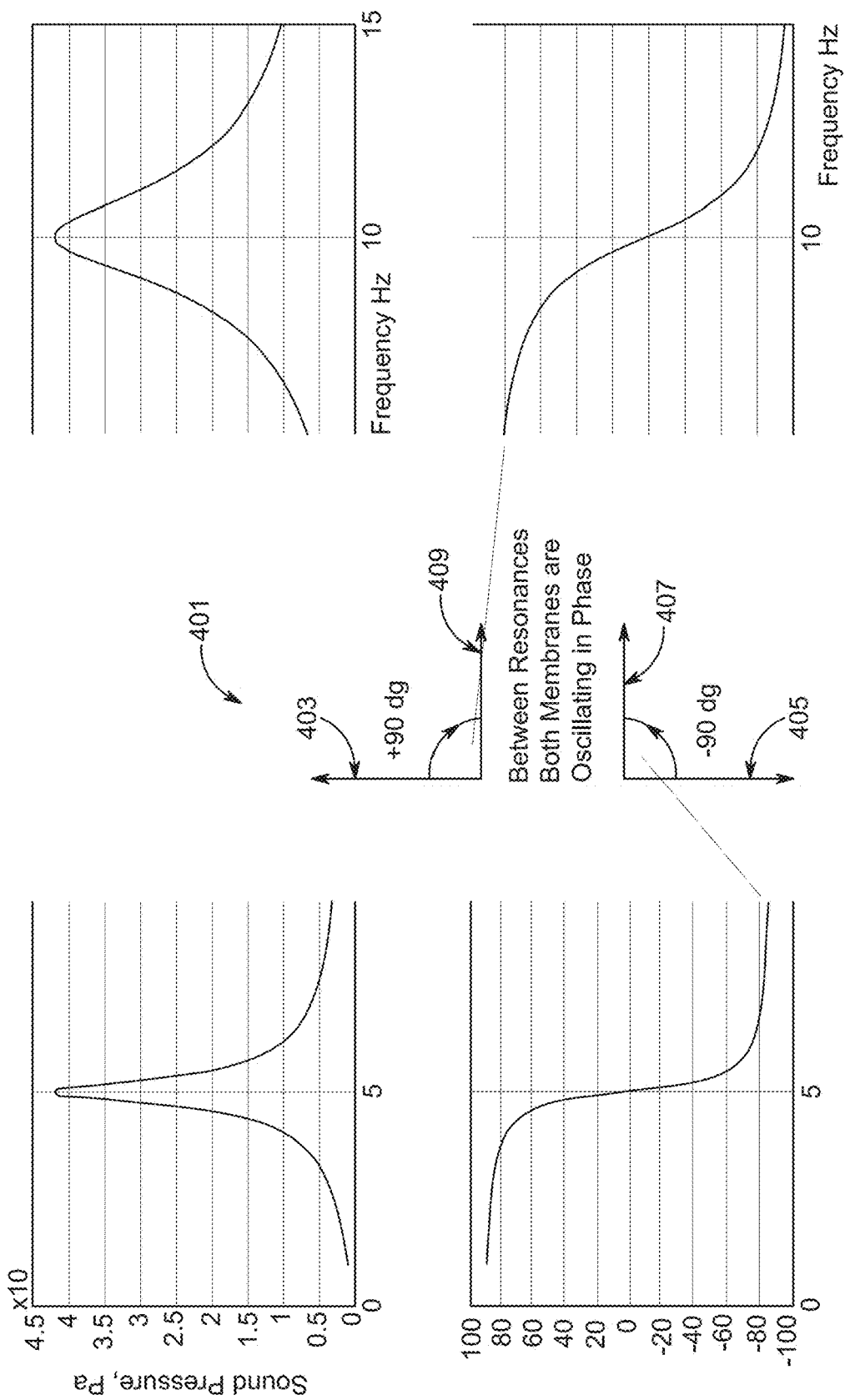
FIG. 4 is a graphical illustration of the frequency response of the embodiment of a doubly-resonant broadband seismic source shown in FIG. 1.

With reference to FIG. 1, FIG. 4 provides graphical illustrations of the physical principles of the doubly-resonant broadband seismic sound source 100. In the vector diagram 401 of FIG. 4, the operation of the piston 105 is shown by referencing the two vertical vectors, 403 and 405, which are turned on 180 degrees relative each other. The volume velocity from the resonator 101 is 403 and is pointing down; the volume velocity from the resonator 103 is 401 and is pointing up.

With reference to the embodiment shown in FIG. 1, if the frequency is changing from low to high, the left lower frequency resonator 101 will dominate at the beginning and the right higher frequency resonator 103 will sound louder at the end. As shown in the vector diagram 401 of FIG. 4, in the middle of the transmission both resonators 101, 103 will vibrate mostly in phase. Indeed, if the frequency of vibration of the sound source is higher than its resonant frequency, the phase of the sound pressure will be shifted on −90 degrees or counter clockwise and will point to the right as indicated by vector 407 for the pressure in a low frequency first resonator. If the frequency of vibration of the sound source is lower than its resonant frequency, then the phase will be +90 degrees and the vector 403 will rotate clockwise as seen in the vector 409 for the high frequency resonator. As a result, sound pressure in the middle of the frequency range in both resonators will generally have the same phase. According, if the resonators 101, 103 are in the middle of frequency range, they will be vibrating in phase and efficiently radiating sound.

A COMSOL finite element analysis confirmation of the doubly-resonant seismic source physics is shown in FIGS. 5A-5D with reference to the embodiment shown in FIG. 1.

Figure 5A:
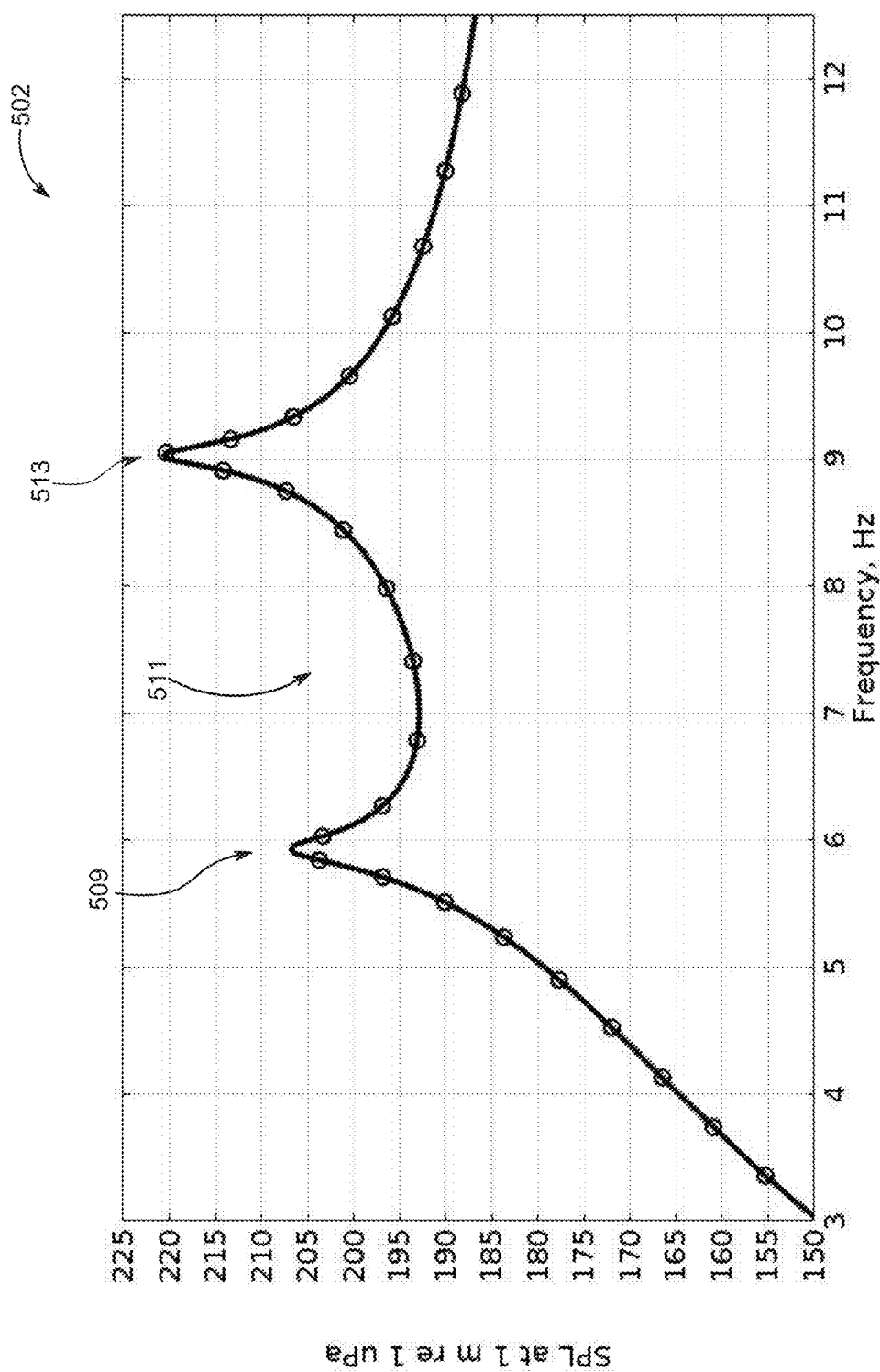
FIGS. 5A-5D illustrate a finite element analysis of an embodiment of a doubly-resonant broadband seismic source according to the present disclosure.
Figure 5B:
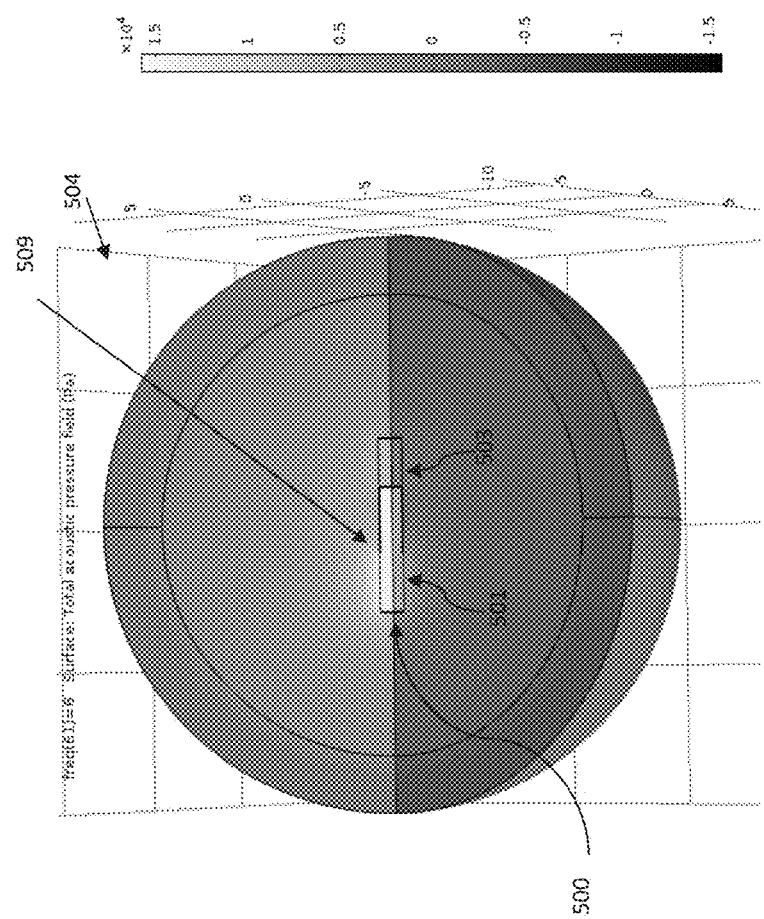

FIG. 5A is a graph 502 of the frequency response of the sound source 500, the same sound source is shown as 100 in FIG. 1, which has a frequency band 5-10 Hz. The graph 502 shows two maxima 509, 513 that correspond to the resonant frequencies of the resonators 501, 503, respectively. A local minima 511 is also shown. A diagram 504 of the total acoustic pressure field exerted on the surfaces of the resonators 501, 503 of the sound source 500 at the frequency 6 Hz corresponding to the maxima 509 is shown in FIG. 5B. As seen in FIG. 5B, the low frequency resonator 501 experiences greater pressure than the high frequency resonator 503 and the pressure is approximately $1.5 \times 10^4$ Pa.

Figure 5C:
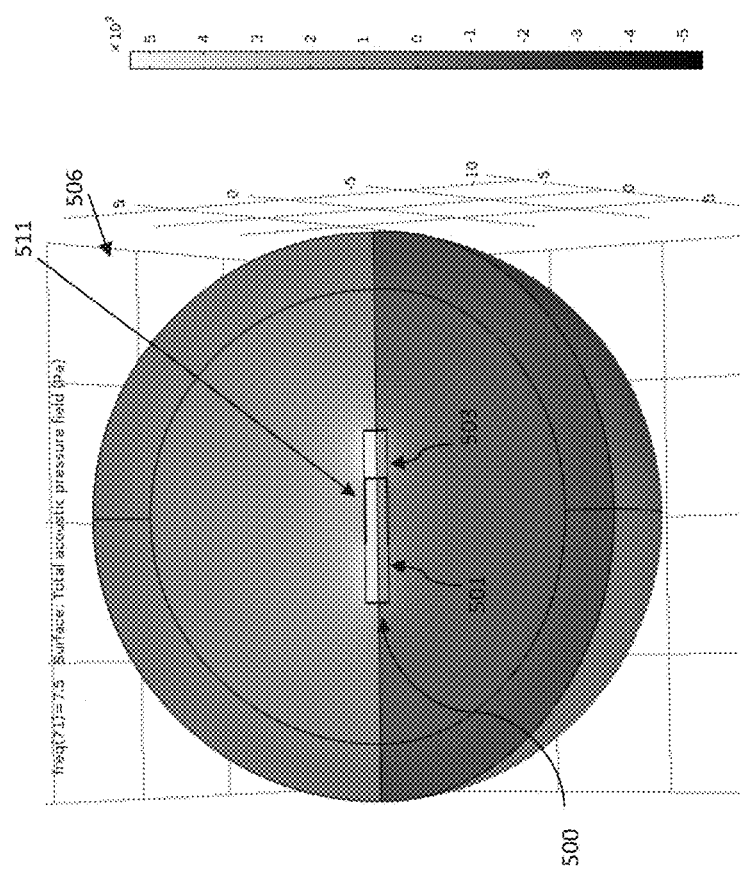
Figure 5D:
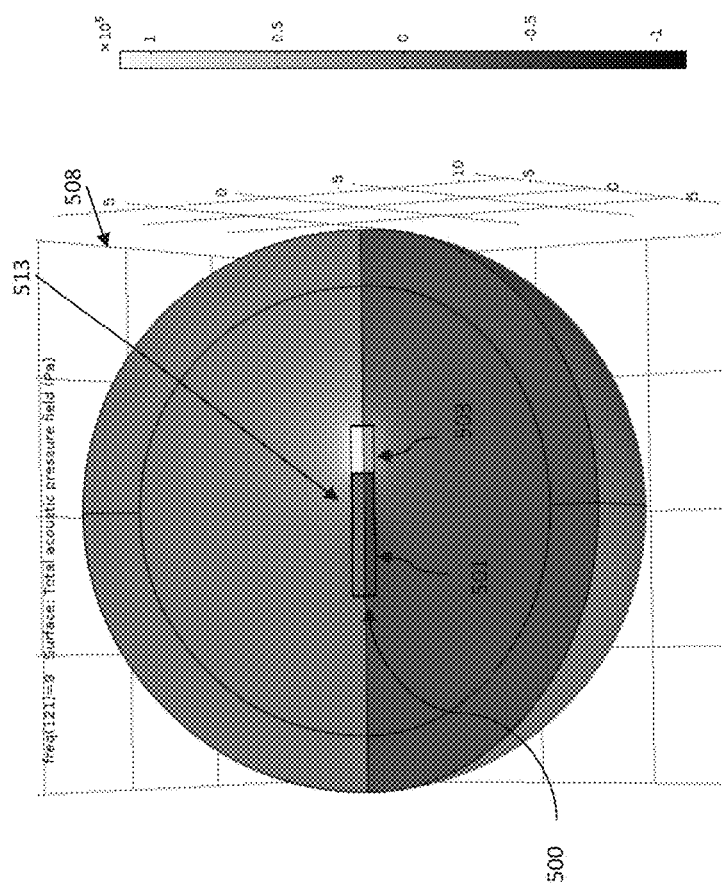

A diagram 506 of the total acoustic pressure field exerted on the surfaces of the resonators 501, 503 of the sound source 500 at the frequency 6.5 Hz between two resonances corresponding to the minima 511 is shown in FIG. 5C. As seen in FIG. 5C, the sound pressure in high frequency resonator 503 experiences the same phase as the sound pressure in the low frequency resonator 501 (shown both by light-grey and the pressure is approximately $5 \times 10^3$ Pa. Both resonators are radiating in the phase. Additionally, diagram 508 of the total acoustic pressure field exerted on the surfaces of the resonators 501, 503 of the sound source 500 corresponding to the maxima 513 is shown in FIG. 5D. As seen in FIG. 5D, the high frequency resonator 503 experiences greater pressure than the low frequency resonator 501 and the pressure is approximately $1.0 \times 10^5$ Pa.

Figure 6:
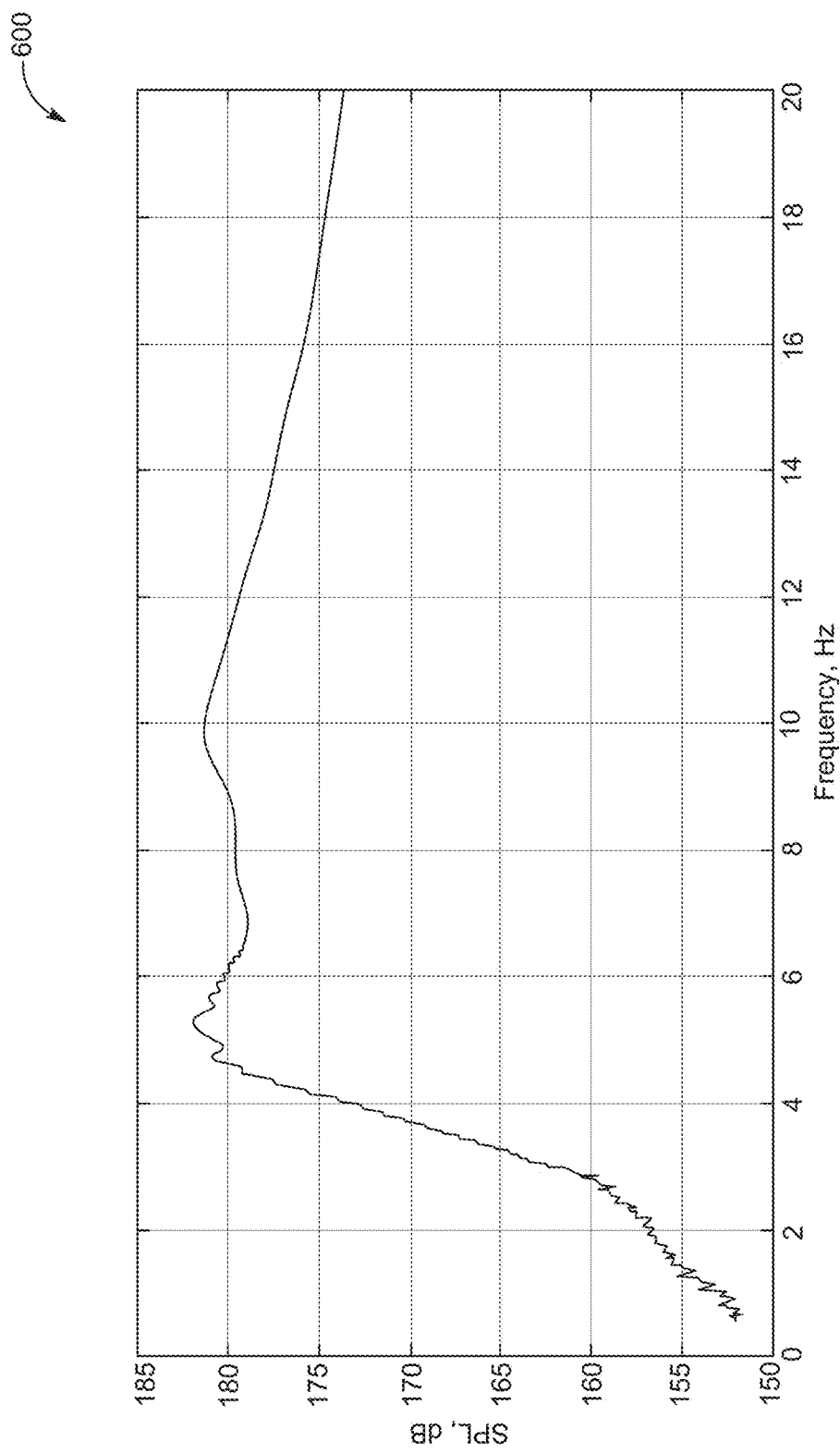
FIG. 6 is a graph of the dependence of pressure inside resonator with a large membrane of an embodiment of a doubly-resonant broadband seismic sound source according to the present disclosure.

FIG. 6 is a graph 600 of the experimental frequency response of an embodiment of a doubly-resonant broadband seismic sound source according to the present disclosure, shown in the FIG. 2C, with a length of 4 m, a diameter of 0.56 m, and a weight of 1232 kg. The sound source pressure level (SPL) in a large 201 resonator had a maximum value of 182 dB. The experimental frequency response was measured in the real Teledyne acoustical pool for experimental prototype, shown in the FIG. 2. As shown in the graph 600 of FIG. 6, the resonant frequencies of the embodiment of the sound source are around 5 Hz and 10 Hz and frequency response covers the total band from 5 to 20 Hz. That bandwidth is very suitable for a lower part of frequency band or air guns used for marine geological survey.

Figure 7:
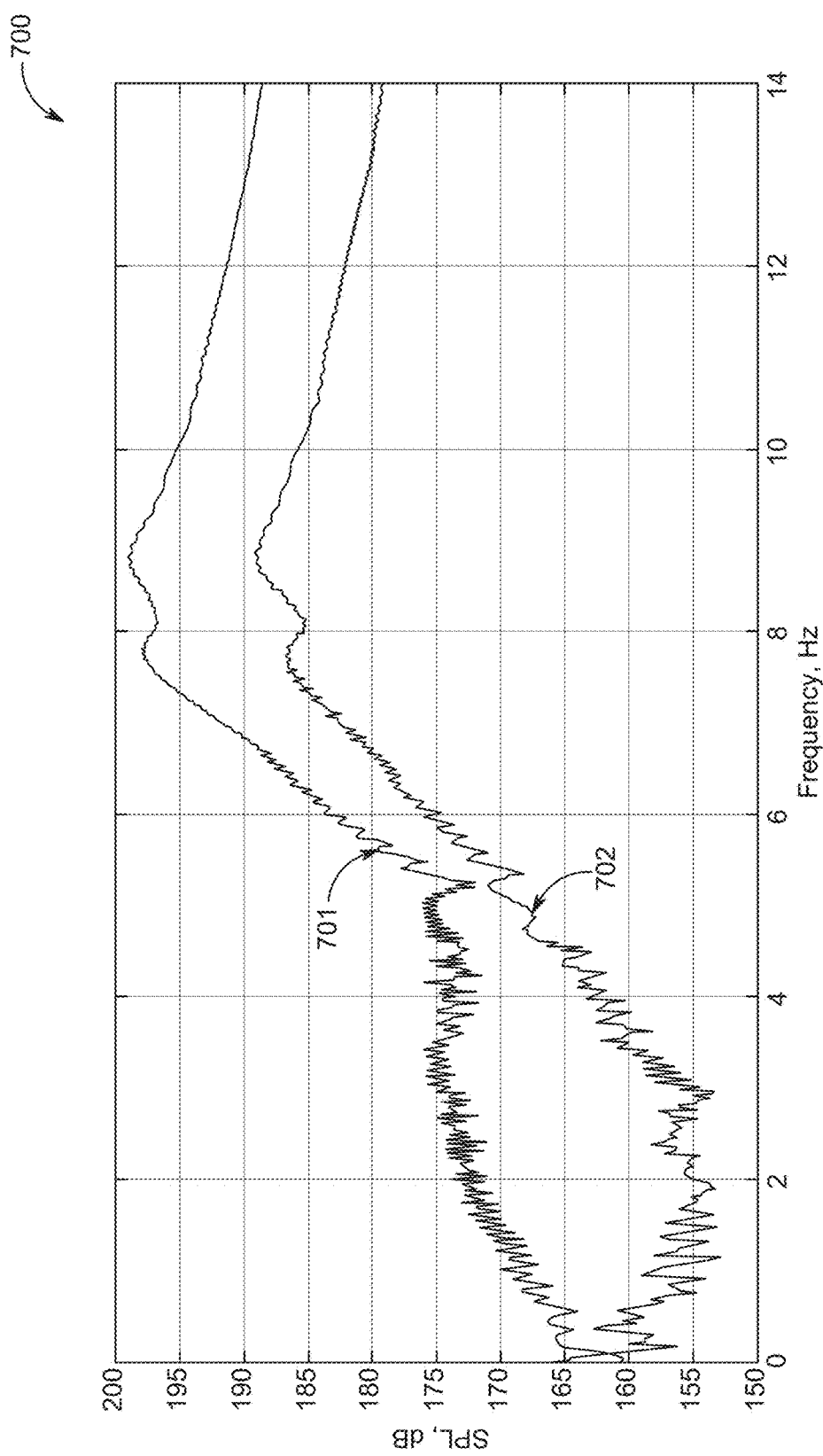
FIG. 7 is a graph of a experimental dependence of pressure inside resonator with a large membrane and sound pressure at the distance 3 m from sound source in water of another embodiment of a doubly-resonant broadband seismic sound source according to the present disclosure.
Figure 8:
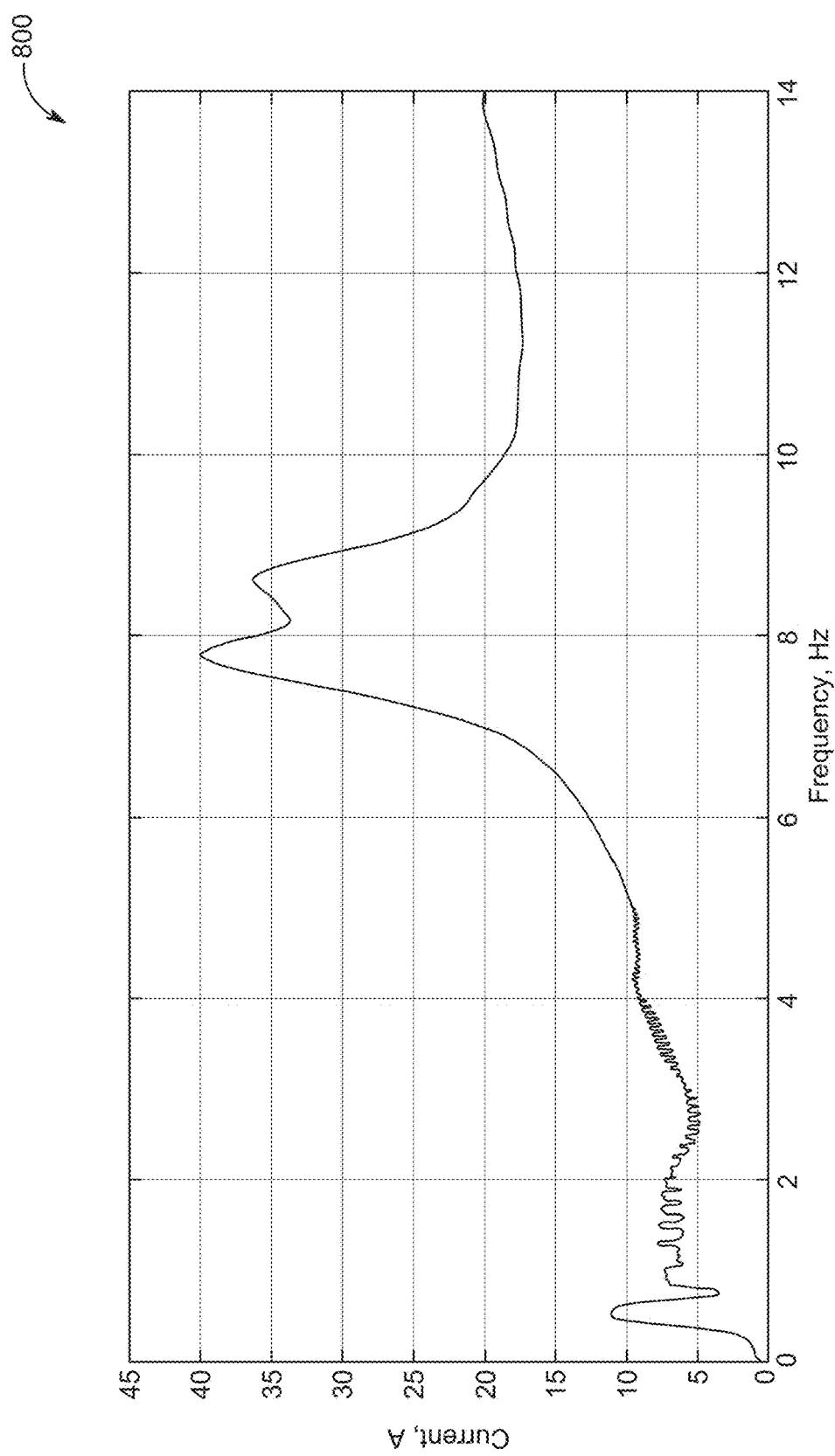
FIG. 8 is a graph of the motor current from a real world pool test of another embodiment of a doubly-resonant broadband seismic sound source according to the present disclosure.

FIGS. 7 and 8 are graphical results of the frequency response from a real world pool test of another doubly-resonant broadband seismic sound source according to the present disclosure, respectively. To change the resonant frequencies of resonators 201 and 203 of the sound source prototype 200 from FIG. 2C, the rubber membrane sections were swapped. As result the resonances became closer and the sound source pressure level increased. The graph 700 shows Sound Pressure Level (SPL) in decibels versus Frequency in Hertz for pressure inside resonator 203 701 and pressure measured by hydrophone 3 meters away from the source 702.

As shown in graphs 701 and 702 the FIG. 7, the resonant frequencies of the embodiment of the doubly-resonant broadband seismic sound source are around 7.5 Hz and 8.7 Hz. The graph 701 shows that the SPL increased compare with graph in FIG. 600; and the frequency bandwidth decreased and became 7-10 Hz. The average current running through the coils of the DC brushless motor versus frequency is shown in the FIG. 8. The current was measured for a real chirp signal when frequency was slowly changing from 0 to 14 Hz. The current follows the SPL of the sound source shown in FIG. 7, which demonstrates the high efficiency of the electro-acoustic transduction.

Figure 9:
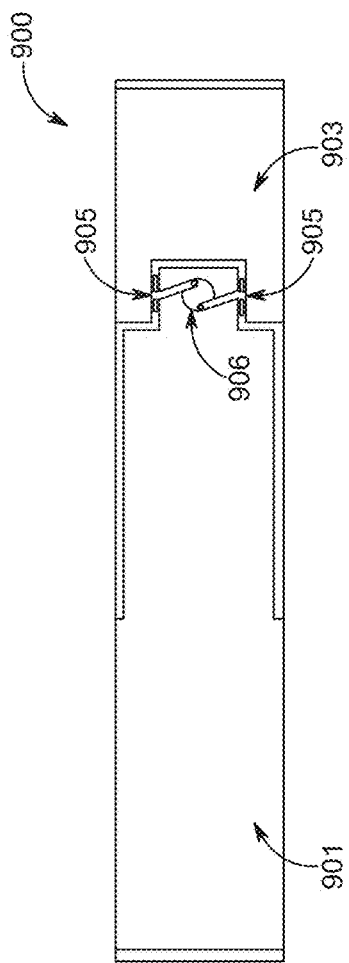
FIG. 9 is a diagram of another embodiment of a doubly-resonant broadband seismic source according to the present disclosure.

FIGS. 9-12 illustrate embodiments of excitation members, also called acoustical drivers, of a doubly-resonant broadband seismic sound source according to the present disclosure. In FIG. 9, an acoustical driver 900 comprises pistons 905 that move in opposite directions. In the embodiment shown in FIG. 9, the acoustical driver 900 has a symmetrical form. The pistons 905 are configured to move between the first, low frequency, resonator 901 and the second, high frequency, resonator 903 based on a rotary motor 906. The pistons 905 may move through separate apertures in a wall of the sound source 900 in opposite directions. According to embodiments, the pistons 905 may be connected to a single motor or more than one motor and may move in phase or out of phase as appropriate.

An acoustical driver 900 with pistons 905 that move in opposite directions may be configured such that it avoids useless vibrations of the source as a whole and may make the sound source 900 more efficient. The first and second resonators 901, 903 may be the same or similar as other embodiments of resonators as described herein.

Figure 10:
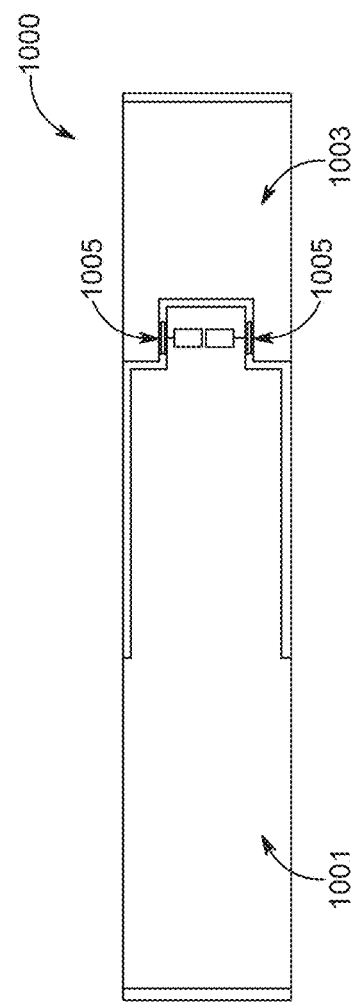
FIG. 10 is a diagram of another embodiment of a doubly-resonant broadband seismic source according to the present disclosure.

In FIG. 10, an acoustical driver 1000 comprises two linear electro-motors 1005 driving in opposite directions. In the embodiment shown in FIG. 10, the acoustical driver 1000 has a symmetrical form. The two linear electro-motors 1005 are configured to move between the first, low frequency, resonator 1001 and the second, high frequency, resonator 1003. According to embodiments, the two linear electro-motors 1005 may move in phase or out of phase as appropriate. The linear motors 1005 may control the sound amplitude by changing a stroke displacement of the linear motors 1005. The first and second resonators 1001, 1003 may be the same or similar as other embodiments of resonators as described herein.

In FIG. 11, an acoustical driver 1100 comprises two sets of pistons 1105, 1107 that move in opposite directions. In the embodiment shown in FIG. 11, the acoustical driver 1100 has a symmetrical form with two rotary motors that have a shifted phase of rotation. In another embodiment, the pistons 1105, 1107 may have an asymmetrical form. The pistons 1105, 1107 are configured to move between the first, low frequency, resonator 1101 and the second, high frequency, resonator 1103 based on a rotary motors 1106, 1108, respectively. The pistons 1105 may move through separate apertures in a wall of the sound source 1100 in opposite directions and similarly, the pistons 1107 may move through yet another set of separate apertures in the wall of the sound source 1100 in opposite directions. Further, the first and second resonators 1101, 1103 may be the same or similar as other embodiments of resonators as described herein. According to embodiments, the pistons 1105, 1107 may be connected to a single motor or more than one motor and may move in phase or out of phase as appropriate.

In one embodiment, the two rotary drivers 1106, 1108 may be configured to operate in parallel, such that the amplitude of the sound source is regulated by shifting a relative phase of rotation in accordance with the equation:

$$A*\cos(\omega t+\varphi)+A*\cos(\omega t)=B*\cos(\omega t+\varphi/2),$$

$$B=A*\cos(\varphi/2)$$

In FIG. 12, an acoustical pneumatic driver 1200 comprises a regenerative blower 1205, low pressure gas accumulating tank 1206, high pressure gas accumulating tank 1207, and two pairs of proportional sleeve valves 1208, 1209. The regenerative blower is attached with a low-pressure input 1210 to the tank 1206 and with its high pressure output 1211 to tank 1207. The controlled valves 1208, 1209 provide open paths for gas between resonators 1201, 1203 and gas tanks 1206, 1207. The resonator 1201 is connected by pair of valves 1208 to the low-pressure tank 1206 and to the high-pressure tank 1207. The resonator 1203 connected with another pair 1209 of valves to the low-pressure tank 1206 and to the high-pressure tank 1207. The proportional sleeve valves 1208, 1209 are shown in FIG. 12 driven by linear actuators 1212, such as voice-coils or small-power linear motors. Each linear actuator 1212 may move the two sliding sleeves 1213, which are attached to one axis 1214, respectively.

According to embodiments, a butterfly valve may be used instead, driven by rotary actuator, such as rotary motor or rotary voice-coil, or any other type of proportional gas valve. The valves in each pair are controlled by one actuator in an opposite way. When connected to high pressure tank valve is opening and gas is streaming into the resonator, the lower pressure valve is closing. The creating pressure pulse will be equivalent to rising pressure from a piston moving inside a resonator such that when connected to lower pressure tank valve is opening and gas is exhausting from the resonator, the high pressure valve from the pair is closing and pressure is changing similar to a piston moving out of a resonator and expanding its volume. Each pair of valves, are configured a way to create a changing pressure inside a resonator similar to that from the moving piston.

Although a pneumatic driver may operate similar to an electrical motor with piston, such an engineering solution may have many advantages. A rotary regenerative blower driven by an electric motor may be prove to be more reliable than a piston system and can run continuously without maintenance for years. Thus, it may be easier and less expensive to build, while it may also be easier to repair. According to embodiments, it may provide higher power efficiency and reliability than for electric motor drivers, similar to a turbo-jet versus piston engine.

A blower system may also provide less vibrations of structure as it is very well balanced. The friction of the air in valves and ducts may be less than the friction of a piston system, and thus it may provide higher efficiency. The low power linear actuator controlling valves may be smaller and faster than actuators that move pistons directly and are potentially suitably for higher frequencies and for arbitrary signal waveform production. The blower system sound source can operate as underwater loud-speaker when voice-coils as linear motors are connected to regular audio amplifier. The valve pairs in a blower system can also be controlled independently with the control of phase shift in the signals to make sound pressure in both resonators oscillating in phase in large frequency band. Using such a configuration may potentially allow combinations of more than two resonators and expand an operable frequency band.

Figure 13:
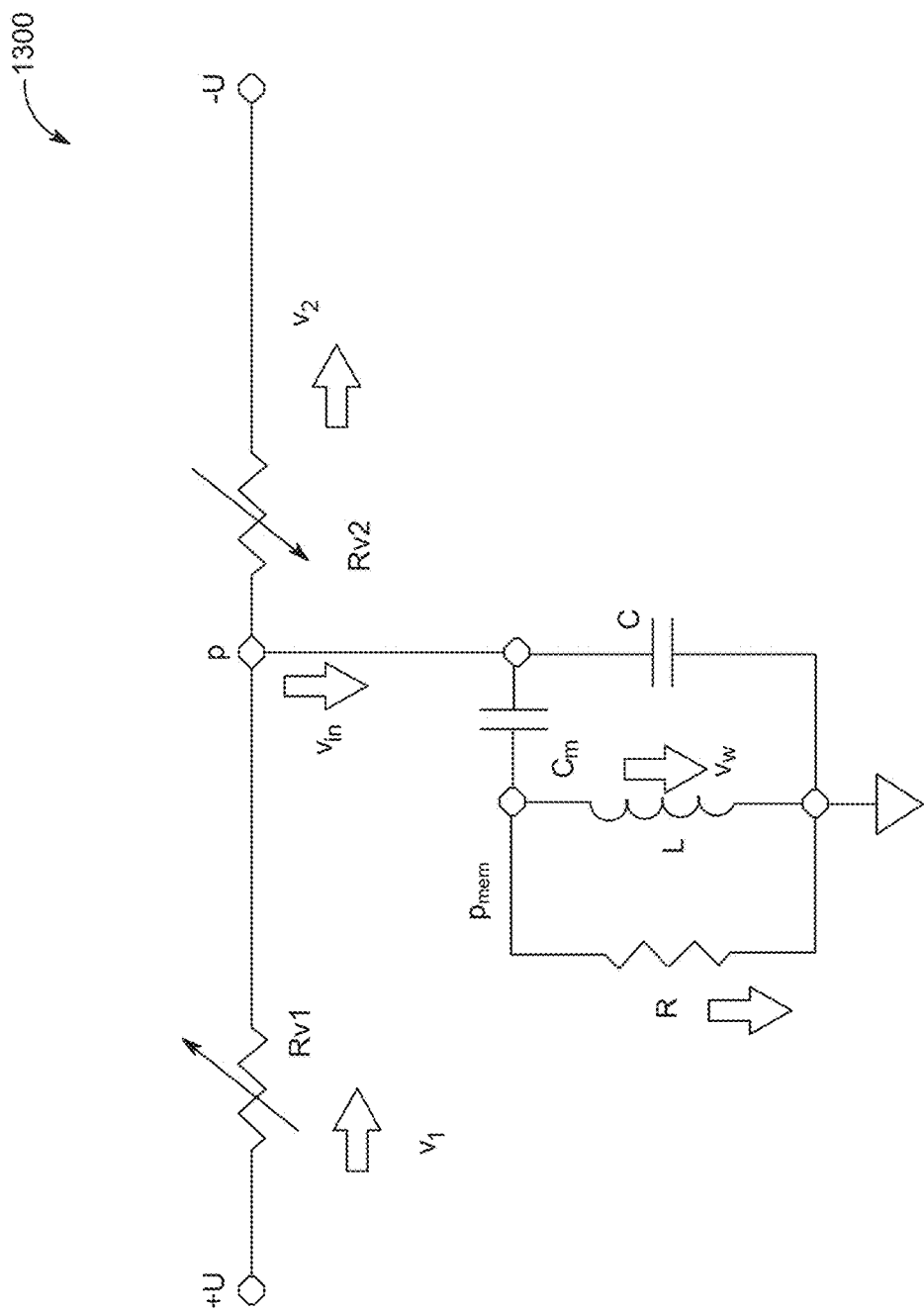
FIG. 13 is a circuit diagram for an electrical circuit for a doubly-resonant two control valve seismic source according to the present disclosure.

Nonlinear differential equations for a dynamic model of seismic source with a blower-siren actuator as referred to in FIGS. 12 and 13 are as follows:

1) $\frac{dp}{dt} = (v_1 - v_2 - v_w)\frac{\gamma P(H)}{V} - (p - p_m)\frac{\gamma P(H)S}{V\rho C}$ 2) $\frac{dp_m}{dt} = v_w \frac{E_{dx}}{Sa^2} + (p - p_m)\frac{E_{dx}}{\rho Ca^2}$ 3) $\frac{dv_w}{dt} = (p - p_{mem})\frac{S}{\rho a}$ 4) $v_{1,2} = \sqrt{\frac{(U \pm p)A_{1,2}}{\alpha \rho_a l_{1,2}}}$ 5) $Pa = (p - p_{mem})$ Where p is variable pressure in the bubble; $v_{1,2}$ are the volume velocity in the control vents 1,2; $v_w$ is the oscillating volume velocity of sound in water; Pa is the acoustical pressure on the membrane surface; γ is the ratio of specific heat at constant pressure to specific heat at constant volume; P(H) is the static bubble pressure at the depth H; V is the volume of the bubble; $p_m$ is the pressure drop on the membrane; S is the area of the membrane; ρ is the density of water; C is the water sound velocity;

$E_{dx} = \frac{N}{\Delta dl/l}$, where Δdl/l is the sterch, Δ is the width of a rubber belt, N is the force in Newtons; a is the radius of the bubble; U is the static pressure of blower; $A_{1,2}$ is the cross section area of the vent; α is the empiric coefficient specific for the vent design; $\rho_a$ is the density of air; and $l_{1,2}$ are the variable lengths of the valves.

FIG. 13 shows an electric circuit diagram 1300 equivalent to equations 1)-5). Where U is the voltage equal to the pressure in a gas accumulating tanks; p is the voltage equal to bubble internal pressure; $p-p_m$ is the voltage equal to external bubble (radiated) pressure; where $v_{1,2}$ are the electric currents equal to the volume velocity of gas flow from gas tanks through the controlled proportional valves; $R_{V1,2}$ are the resistors equivalent to the proportional controlled valves with the current in governed by the equation 4); $v_{in}=v_1-v_2$ is the current equal to resulting volume velocity changing in the bubble; $v_w$ is the current equal to the oscillation fraction of bubble volume velocity;

$\frac{p - p_m}{R}$;

is the current equal to the radiated fraction of bubble volume velocity; C is the capacitor equivalent to compresability of bubble, $C = \frac{V}{\gamma P(H)}$;

L is the inductor equivalent to the inertia of oscillating water mass attached to the bubble, $L = \frac{\rho a}{S}$;

$C_m$ is the capacitor equivalent to the elasticity of the membrane, $C_m = \frac{Sa^2}{E_{dx}}$;

R is the radiation resistor, $R = \frac{\rho C}{S}$.

Figure 14:
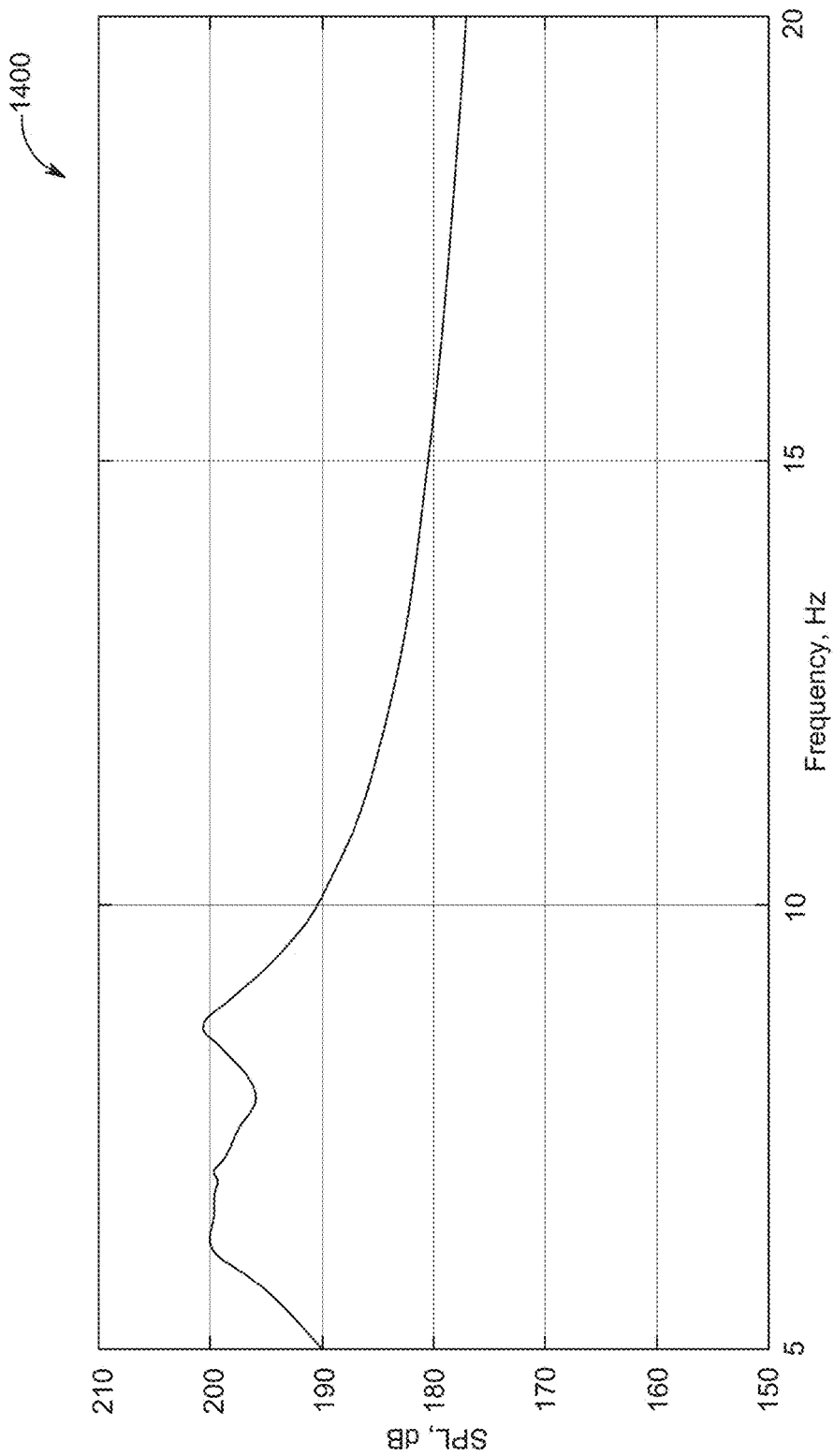
FIG. 14 is a graph of computer simulated frequency response of a doubly-resonant seismic source with a pneumatic blower driver according to the present disclosure.

FIG. 14 shows the graph 1400 that comprises simulation results with reference to the embodiment shown in FIG. 12. The simulation has been performed using the differential equations 1)-5) for each bubble with the different parameters. The graph shows the pressure $P_a=p-p_m$ on the external surface of the bubble. The graph 1400 illustrates the ability of that driver to cover the frequency range from 5 to 20 Hz.

Reference throughout the specification to "various embodiments," "some embodiments," "one embodiment," "an embodiment", "one aspect," "an aspect" or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures or characteristics may be combined in any suitable manner in one or more aspects. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

While various details have been set forth in the foregoing description, it will be appreciated that the various aspects of the present disclosure may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for various aspects, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various embodiments are described in the following numbered clauses:

1. A sound source, comprising:
a first gas filled underwater resonator;
a second gas filled underwater resonator connected to the first resonator; and
at least one excitation member configured to excite the first gas filled underwater resonator and the second gas filled underwater resonator; and
wherein the first gas filled underwater resonator is permanently tuned to produce a first resonant frequency upon excitation by the at least one excitation member; and
wherein the gas filled underwater second resonator is permanently tuned to produce a second resonant frequency upon excitation by the at least one excitation member; and
wherein the first resonant frequency is different from the second resonant frequency.

2. The sound source of clause 1, wherein the at least one excitation member moves between an interior chamber of the first gas filled underwater resonator and an interior chamber of the second gas filled underwater resonator in opposite directions.

3. The sound source of clauses 1 or 2, wherein at least one of the first resonant frequency and the second resonant frequency is within a range of 5-20 Hz.

4. The sound source of any one of clauses 1-3, wherein the at least one excitation member comprises at least one piston driven by at least one motor.

5. The sound source of clause 4, wherein the at least one motor comprises a rotary motor or a linear motor.

6. The sound source of any one of clauses 4 or 5, wherein the at least one motor is located between the first gas filled underwater resonator and the second gas filled underwater resonator.

7. The sound source of any one of clauses 1-6, wherein the first resonator comprises a first bubble cylindrical resonator and the second resonator comprises a second bubble cylindrical resonator.

8. The sound source of clause 7, wherein each of the first bubble cylindrical resonator and the second bubble cylindrical resonator has inelastic edges and elastic cylindrical walls under internal pressure.

9. The sound source of clause 8, wherein the first underwater bubble cylindrical resonator is connected to the second underwater bubble cylindrical resonator by a wall.

10. The sound source of any one of clauses 1-9, further comprising an inelastic tube surrounding one of the first resonator or the second resonator.

11. The sound source of any one of clauses 1-10, wherein the at least one excitation member comprises at least one piston driven by at least one motor, wherein the at least one piston is configured to move through at least one aperture of the wall to excite at least one of the first bubble cylindrical resonator and the second bubble cylindrical resonator.

12. The sound source of any one of clauses 1-11, wherein the at least one excitation member is configured to excite the first gas filled underwater resonator and the second gas filled underwater resonator by changing a volume of the interior chamber of the first gas filled underwater resonator and by changing a volume of the interior chamber of the second gas filled underwater resonator.

13. The sound source of any one of clauses 1-12, wherein the at least one excitation member comprises at least one linear motor, and the at least one excitation source is configured to control an amplitude of sound emitted by the sound source based on stroke displacement of the at least one linear motor.

14. The sound source of any one of clauses 1-12, wherein the at least one excitation member comprises first rotary motor and a second rotary motor, and the at least one excitation source is configured to control an amplitude of sound emitted by the sound source based on a phase of rotation of the first rotary motor relative to the second rotary motor.

15. The sound source of any one of clauses 1-12, wherein the at least one excitation member comprises at least one regenerative blower with inlet and outlet proportional valves independently controlling a pneumatic pulse waveform.

16. A sound source, comprising:
a first gas filled resonator tube;
a second gas filled resonator tube connected to the first gas filled resonator tube; and
at least one excitation member configured to excite the first gas filled resonator tube and the second gas filled resonator tube, wherein the at least one excitation member is configured to excite the first gas filled resonator tube and the second gas filled resonator tube by changing a volume of the interior chamber of the first gas filled resonator tube and by changing a volume of the interior chamber of the second gas filled resonator tube; and
wherein the at least one excitation member is configured to excite the first gas filled resonator tube and the second gas filled resonator tube sequentially; and
wherein the first gas filled resonator tube is permanently tuned to produce a first resonant frequency upon excitation by the at least one excitation member; and
wherein the second gas filled resonator tube is permanently tuned to produce a second resonant frequency upon excitation by the at least one excitation member; and
wherein the first resonant frequency is different from the second resonant frequency.

What is claimed is:
1. A sound source, comprising:
a first gas filled resonator;
a second gas filled resonator connected to the first gas filled resonator; and
at least one excitation member configured to excite the first gas filled resonator and the second gas filled resonator;
wherein the first gas filled resonator is tuned, via a first inelastic device that surrounds at least a portion of the first gas filled resonator, to produce a first resonant frequency upon excitation by the at least one excitation member;

wherein the second gas filled resonator is tuned, via a second inelastic device that surrounds at least a portion of the second qas filled resonator, to produce a second resonant frequency upon excitation by the at least one excitation member; and wherein the first resonant frequency is at a first edge of a frequency band and the second resonant frequency is at a second edge of the frequency band.

2. The sound source of claim 1, wherein the at least one excitation member is configured to move between an interior chamber of the first gas filled resonator and an interior chamber of the second gas filled resonator in opposite directions.

3. The sound source of claim 1, wherein the frequency band is 5-20 Hz.

4. The sound source of claim 1, wherein the at least one excitation member comprises at least one piston driven by at least one motor.

5. The sound source of claim 4, wherein the at least one motor comprises a rotary motor or a linear motor.

6. The sound source of claim 4, wherein the at least one motor is located between the first gas filled resonator and the second gas filled resonator.

7. The sound source of claim 1, wherein the first gas filled resonator comprises a first bubble cylindrical resonator and the second gas filled resonator comprises a second bubble cylindrical resonator.

8. The sound source of claim 1, wherein each of the first gas filled resonator and the second gas filled resonator comprises an inelastic end cap and elastic cylindrical walls under internal pressure.

9. The sound source of claim 1, wherein the first gas filled resonator is connected to the second gas filled resonator by a wall.

10. The sound source of claim 9, wherein the at least one excitation member comprises at least one piston driven by at least one motor, and wherein the at least one piston is configured to move through at least one aperture of the wall to excite at least one of the first gas filled resonator or the second gas filled resonator.

11. The sound source of claim 1, wherein the at least one excitation member is configured to excite the first gas filled resonator and the second gas filled resonator by changing a volume of an interior chamber of the first gas filled resonator and by changing a volume of an interior chamber of the second gas filled resonator.

12. The sound source of claim 1, wherein the at least one excitation member comprises at least one linear motor, and wherein the at least one excitation member is configured to control an amplitude of sound emitted by the sound source based on stroke displacement of the at least one linear motor.

13. The sound source of claim 1, wherein the at least one excitation member comprises at least one rotary motor, and wherein the at least one excitation member is configured to control an amplitude of sound emitted by the sound source based on a phase of rotation of the at least one rotary motor.

14. The sound source of claim 1, wherein the excitation member comprises a valve between the first gas filled resonator and the second gas filled resonator, and wherein the valve is configured to open and close to create a pressure pulse.

15. A sound source, comprising:
a first resonator tube comprising a first resonator;
a second resonator tube comprising a second resonator, wherein the second resonator tube is connected to the first resonator tube; and
at least one excitation member configured to excite the first resonator of the first resonator tube and the second resonator of the second resonator tube sequentially, wherein the at least one excitation member is configured to excite the first resonator and the second resonator by changing a volume of an interior chamber of the first resonator and by changing a volume of an interior chamber of the second resonator;
wherein the first resonator tube envelops a portion of the first resonator to cause the first resonator to produce a first resonant frequency upon excitation by the at least one excitation member;
wherein the second resonator tube envelops a portion of the second resonator to cause the second resonator to produce a second resonant frequency upon excitation by the at least one excitation member; and
wherein the first resonant frequency is at a first edge of a frequency band and the second resonant frequency is at a second edge of the frequency band.

16. The sound source of claim 15, wherein the at least one excitation member is configured to change a volume in each of the first resonator and the second resonator in an opposite fashion, and wherein when the volume in the first resonator is increasing, the volume in the second resonator is decreasing.

17. The sound source of claim 15, wherein the first resonant frequency is greater than the second resonant frequency.

18. The sound source of claim 15, wherein the at least one excitation member comprises at least one motor.

19. A sound source, comprising:
a first gas filled resonator;
a second gas filled resonator connected to the first gas filled resonator; and
at least one excitation member configured to excite the first gas filled resonator and the second gas filled resonator;
wherein the first gas filled resonator is tuned, via a rigid material that surrounds at least a portion of the first gas filled resonator, to produce a first resonant frequency upon excitation by the at least one excitation member;
wherein the second gas filled resonator is tuned, via a rigid material that surrounds at least a portion of the second gas filled resonator, to produce a second resonant frequency upon excitation by the at least one excitation member;
wherein each of the first resonant frequency and the second resonant frequency are within a frequency band of 5-20 Hz; and
wherein the first gas filled resonator is connected to the second gas filled resonator by a wall, and wherein the at least one excitation member is configured to excite at least one of the first gas filled resonator or the second gas filled resonator via at least one aperture of the wall.

20. The sound source of claim 1, wherein each of the first edge of the frequency band and the second edge of the frequency band are below 20 Hz.

* * * * *